United States Patent

[11] 3,533,366

| [72] | Inventor | Farrel J. Francom<br>332 Ridge Road, Moses Lake, Washington 98837 |
|---|---|---|
| [21] | Appl. No. | 713,642 |
| [22] | Filed | March 18, 1968 |
| [45] | Patented | Oct. 13, 1970 |

[54] APPLICATOR FOR APPLYING AGRICULTURAL CHEMICALS TO SOILS
1 Claim, 7 Drawing Figs.

[52] U.S. Cl. .................................................. 111/7, 111/80
[51] Int. Cl. .................................................. A01c 23/02
[50] Field of Search .................................................. 111/1, 6, 7, 80

[56] References Cited
UNITED STATES PATENTS

| 423,723 | 3/1890 | Bemis | 111/7 |
| 486,200 | 11/1892 | Starks et al. | 111/7 |
| 2,722,902 | 11/1955 | Hyatt | 111/7 |
| 2,988,025 | 6/1961 | Johnston | 111/6 |
| 3,398,706 | 8/1968 | Ruetenik | 111/7 |
| 3,435,785 | 4/1969 | Harbolt | 111/6 |

FOREIGN PATENTS

| 1,060,649 | 4/1954 | France | 111/7 |

*Primary Examiner*—Robert E. Bagwill
*Attorney*—Wells and St. John

ABSTRACT: The disclosure describes an applicator for injecting agricultural chemicals into the soil at prescribed depths and intervals. The applicator has a frame for attaching to a tool bar. A shoe is pivotally mounted to the frame for sliding over the surface of the soil. The rear end of the shoe is spring biased downwardly to maintain ground contact. Two offset blades project downwardly from the shoe for forming their parallel grooves in the soil. Tubes are welded along the back of the blades as an integral part of the blades for injecting fluid into the soil at the base of the groove. The blades are offset to prevent the buildup of soil between the blades.

Patented Oct. 13, 1970

INVENTOR.
FARREL J. FRANCOM
BY
Wells & St John

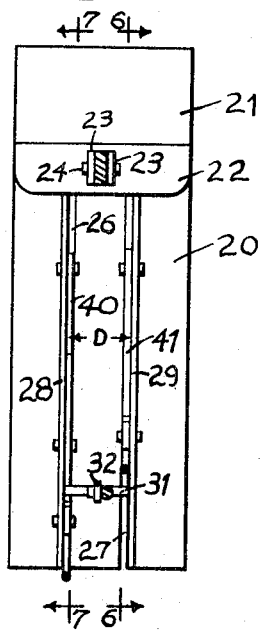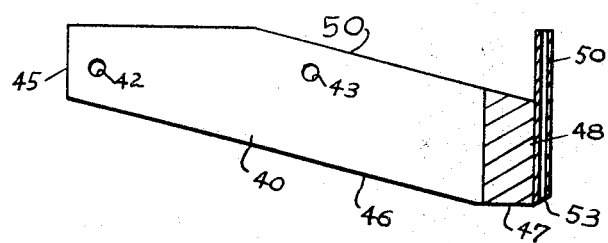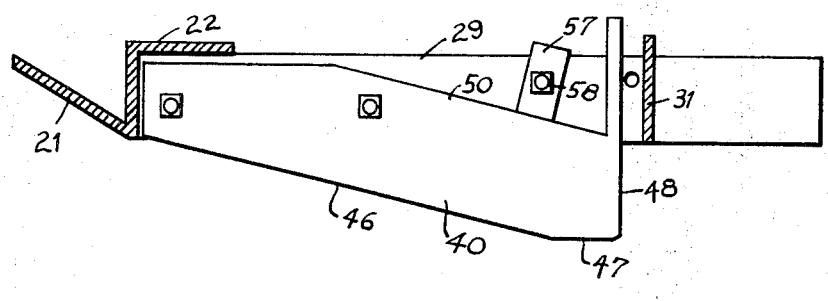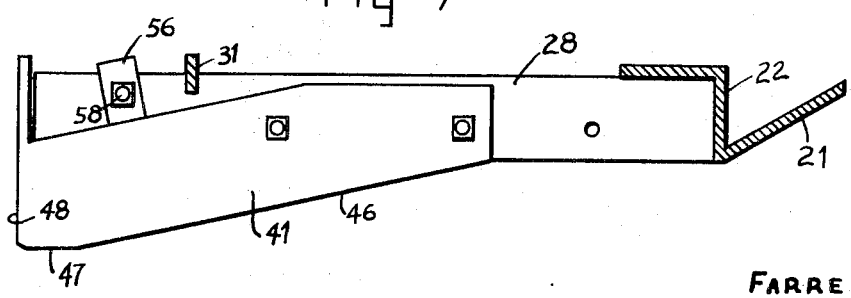

3,533,366

APPLICATOR FOR APPLYING AGRICULTURAL CHEMICALS TO SOILS

BACKGROUND OF THE INVENTION

This invention relates to the application of agricultural chemicals to soils and more particularly to applicators for injecting agricultural fluid chemicals into the soil at preset depths.

One of the principal objects of this invention is to provide a versatile and simple applicator for accurately injecting agricultural fluid chemicals into the soil at preset depths.

Another principal object of this invention is to provide an applicator for efficiently applying the agricultural fluid chemical into the soil in such a manner as to minimize the amount of liquid used without compromising the results of the fluid application.

An additional object of this invention is to provide a durable applicator that is capable of accurately injecting fluids into the soil in parallel paths and at preset depths.

A further object of this invention is to provide a precision applicator that does not become clogged when applying liquid to wet or moist soils.

An additional object of this invention is to provide a liquid applicator that is relatively inexpensive to manufacture and which has a long wear life.

A further object of this invention is to provide a liquid applicator with blades that may be readily replaced when excessively worn.

An additional object of this invention is to provide a liquid applicator having adjustable blades for setting the depth at which the liquid will be injected into the soil.

These and other objects and advantages of this invention will become apparent upon reading the following detailed description of a preferred embodiment of this invention.

BRIEF DESCRIPTION OF THE DRAWINGS

A preferred embodiment of this invention is illustrated in the accompanying drawings, in which:

FIG. 4 is a horizontal cross-sectional view of the applicator taken along line 4—4 in FIG. 1 showing in plan view several of the applicator components—a shoe and two spaced offset blades;

FIG. 5 is a fragmentary side elevational view of one of the blades showing in vertical cross section a tube formed integrally along the rear edge of the blade;

FIG. 6 is a vertical cross-sectional view taken along line 6—6 in FIG. 4 showing the mounting of one of the blades to the shoe; and FIG. 7 is a vertical cross-sectional view taken along line 7—7 in FIG. 4 showing the mounting of the other blade to the shoe offset rearward of the first blade.

DETAILED DESCRIPTION OF A PREFERRED EMBODIMENT

Figure 1:
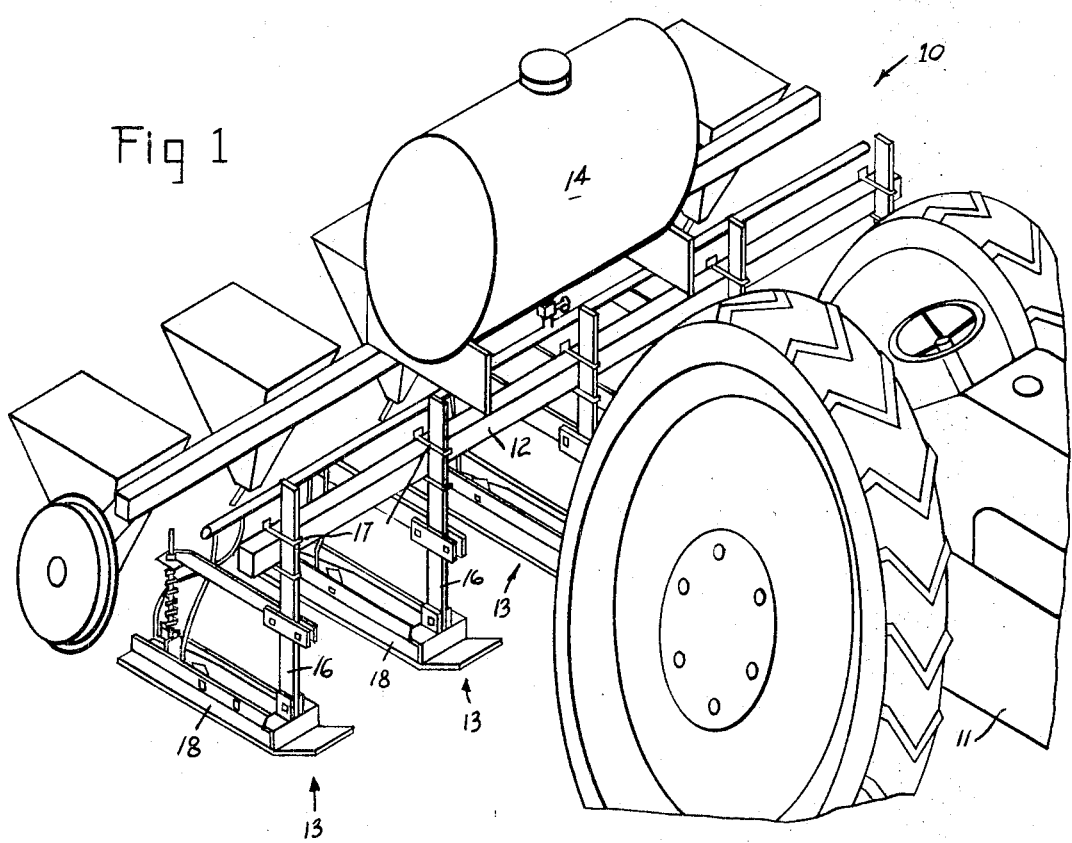
FIG. 1 is a perspective view of an agricultural implement showing a plurality of applicators mounted on a tool bar for applying agricultural liquid chemicals to the soil at transversely spaced rows behind a prime mover such as a tractor.

Referring now in detail to the drawings, there is shown in FIG. 1 an agricultural implement 10 such as a seed planter mounted behind a prime mover such as a tractor 11. A tool bar 12 is mounted transversely across the agricultural implement.

A plurality of applicators 13 are mounted equally spaced along the tool bar for injecting an agricultural liquid chemical from a liquid tank 14 into the soil at a preset depth and spacing as the applicators are propelled over the ground by the tractor. The applicators 13 may be spaced along the tool bar 12 at such intervals as determined by the conditions under which the agricultural liquid chemical is being applied to the soil. In this illustration each of the applicators is positioned immediately in front of a seed planting unit.

Each of the applicators 13 has a frame with a standard 16 that is mounted substantially vertical in front of the tool bar by a clamp 17.

A shoe 18 is pivotally mounted to the lower end of the vertical standard 16 for engaging the soil surface and maintaining contact therewith as the agricultural implement is propelled over the soil.

Figure 2:
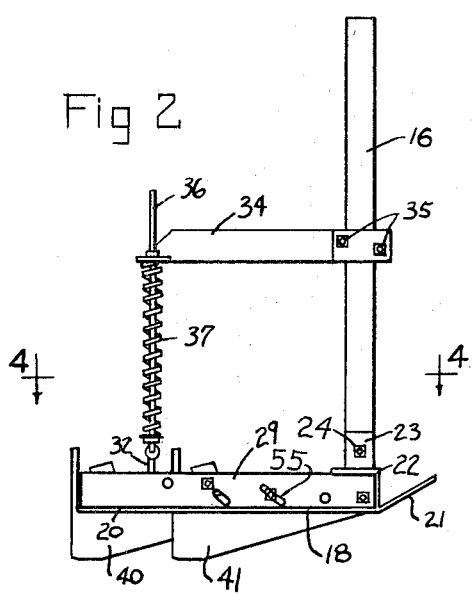
FIG. 2 is a side view of one of the applicators.

The shoe 18 has an elongated bottom plate 20 with an inclined front plate 21 formed thereon and extending forward therefrom representing an inclined surface to the soil for enabling the shoe to satisfactorily glide over the surface of the soil. A transverse channel 22 is mounted on the bottom plate 20 near the front. Lugs 23 (FIGS. 2 and 4) are formed on the top of the channel 22 for supporting a bolt 24 that extends through the lugs and the lower end of the vertical standard 16 to provide a pivot connection between the shoe and the standard at the front of the shoe.

As shown in FIG. 4, spaced longitudinal slots 26 and 27 are formed in the bottom plate 20. The distance between the longitudinal slots is designated by the letter D. Elongated flanges 28 and 29 are mounted on the plate 20 adjacent the outer edge of the slots 26 and 27 respectively. A cross brace 31 extends between the flanges 28 and 29 near the back of the shoe. The front ends of the flanges 28 and 29 are welded to the cross channel 22 to provide rigidity. An upstanding bracket 32 (FIG. 2) is formed on the cross brace 31 and extends upwardly therefrom.

A substantially horizontal frame member 34 (FIG. 2) is mounted to the vertical standards 16 and extends rearward over the shoe 18. The horizontal member is adjustably secured to the upstanding standard 16 by bolts 35. A rod 36 is slidably mounted to the rear end of the horizontal member 34 and extends downward to a pivotal connection with the bracket 32. A compression spring 37 is mounted on the rod 36 between the horizontal member 34 and the bracket 32 for biasing the back of the shoe downwardly so that the underneath side of the shoe 18 is in firm engagement with the soil at all times.

Two blades or runners 40 and 41 are mounted to the shoe 18 in the slots 26 and 27 respectively. The blades 40 and 41 extend downwardly from the bottom plate 20 for forming thin parallel grooves in the soil as the agricultural implement is moved.

Each of the blades 40 and 41 (FIG. 5) have mounting apertures 42 and 43 formed therein for receiving bolts for securely mounting the blade to the sides of the flanges 28 and 29 at various longitudinal positions.

Each blade 40 and 41 has a vertical front surface 45 (FIG. 5) and an inclined bottom surface 46 that extends downwardly and rearwardly from the vertical front surface 45 to a horizontal bottom surface 47 near the rear of the blade. The horizontal bottom surface extends to a vertical rear edge 48. An inclined top surface 50 is formed on each of the blades. An elongated tube 50 (FIG. 5) is integrally formed on the rear edge of each of the blades 40 and 41. The tube extends from the horizontal bottom surfaces 47 above the inclined top surface 50.

Each of the tubes have an inclined bottom opening 53 slanted upward and rearward for facilitating the discharge of the liquid from the tube into the thin groove formed by the corresponding blade. Each of the tubes 52 is welded integrally with the blade so that the side surfaces of the blades blend into the wall of the tube to form one integral part.

Each of the blades 40 and 41 are adjustably mounted to the flanges 28 and 29 respectively to enable the blades to be moved vertically with respect to the bottom of the shoe to adjust the depth of the groove that the blade makes in the soil. Each of the flanges 28 and 29 has an elongated slot 55 formed therein (FIG. 2) for permitting movement of the blade vertically to adjust the depth of the groove formed by the blade.

It should be noted that the blades 40 and 41 are mounted on the shoe 18 with one blade offset with respect to the other. In this illustration, blade 41 is mounted rearwardly of the blade 40. This prevents the buildup of soil between the blades underneath the bottom plate 20 when the soil is wet or moist. The various apertures in the flanges 28 and 29 enable the blades to be mounted at different longitudinal offset positions with respect to the shoe and each other.

After the blades 40 and 41 are bolted into position stop plates 56 and 57 (FIGS. 6 and 7) are bolted to the flanges 28 and 29 respectively for engaging the inclined top surfaces 50 of the blades 40 and 41 respectively to prevent the upward vertical movement of the blades. The stop plates 56 and 57 are bolted to the flanges 28 and 29 by bolts 58.

Figure 3:
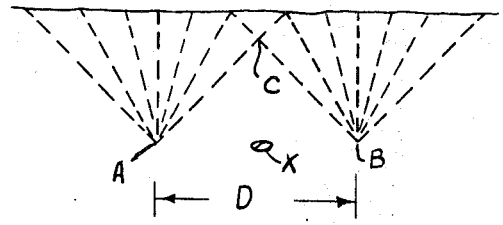
FIG. 3 is a vertical transverse view of a layer of soil showing the distribution pattern of the agricultural liquid chemical after it is injected into the soil by one of the applicators.

To appreciate the efficient application of liquid to the soil utilizing the applicators, the reader's attention is directed to FIG. 3. If the applicators 13 are utilized in conjunction with a seed planting implement, the soil pattern may look something like that shown in FIG. 3. The agricultural liquid chemical is injected into the soil at a specified depth and at specified bands. For purpose of illustration it will be assumed that the fluid is injected into the soil by blade 40 at point A and by blade 41 at point B. It has been found that liquid will migrate through the soil upwardly in a substantially funnel shape from the point where the liquid is deposited or injected into the soil. It should be noted that the migration patterns or bands from the liquid deposit at point A and B intersect at point C which is slightly below the surface of the ground and above a seed X that is planted in the ground by the seed unit immediately behind the applicator. In this manner the fluid does not interfere with the initial growth of the seed. If the agricultural chemical that is injected into the soil is a weedkiller, the liquid will prevent the growth of weeds along the entire surface of the soil adjacent to the seed without interfering with the growth of the seed until the seed has sprouted and begins to break the surface of the soil. By utilizing applicators 13, one can readily appreciate the economic saving in the amount of agricultural liquid chemical that is used to efficiently obtain the desired agricultural result.

The agricultural liquid chemical may be stored in a liquid tank like that shown in FIG. 1. FIG. 1 illustrates a liquid distribution system including a valve, feeder line and flexible hoses from the feeder line down to each individual tube 52 of each blade. The distribution system may be varied as required in feeding liquid into the tubes 52.

It should be appreciated that the above described embodiment is simply illustrative of the principles of this invention and numerous modifications may be made without deviating from the principles thereof. Therefore, only the following claims are intended to define this invention.

I claim:

1. A planter comprising:
   a mobile vehicle;
   a seed planting unit mounted on the vehicle having means for planting a row of seeds in the soil at a prescribed depth as the vehicle is moved over the soil;
   an applicator mounted on the vehicle for applying agricultural liquid gas chemical to the soil at a prescribed depth along both sides of a row of seeds, said applicator comprising;
   a depending frame securely attached to the vehicle;
   an elongated shoe pivotally attached to the frame adjacent the front of the shoe and aligned with the seed planting device for engaging and riding over the surface of the soil;
   a spring means operatively connected between the depending frame and the elongated shoe for biasing the rear of the shoe firmly in engagement with the soil;
   a pair of spaced blades mounted on the shoe straddling the row of seeds, extending downward into the soil to a prescribed depth along both sides of the row of seeds;
   said blades having thin inclined bottom surfaces extending downward and rearward toward trailing edges for forming thin grooves in the soil of the prescribed depth along both sides of the row;
   said tubes having substantially vertical tubes formed at the trailing edges extending to the bottom surfaces; and
   a source of agricultural liquid communicating with the vertical tubes for directly injecting the agricultural liquid chemical into the soil at the prescribed depth on both sides of the row of seeds.